UNITED STATES PATENT OFFICE.

PEMBROKE NESBIT SQUIRES, OF TEKAMAH, NEBRASKA.

HEADLIGHT-ADJUSTER FOR VEHICLES.

1,216,619.

Specification of Letters Patent.

Patented Feb. 20, 1917.

Application filed June 27, 1916. Serial No. 106,128.

*To all whom it may concern:*

Be it known that I, PEMBROKE N. SQUIRES, a citizen of the United States, residing at Tekamah, in the county of Burt and State of Nebraska, have invented certain new and useful Improvements in Headlight-Adjusters for Vehicles, of which the following is a specification, reference being had therein to the accompanying drawing.

This invention relates to improvements in headlight adjusters for vehicles, more particularly motor vehicles of the type or character adapted to adjust the lamps automatically in accordance with the turning movement of the front or steering wheels of the vehicle.

In my prior patent, No. 1,032,309, dated July 9, 1912, I have illustrated, described and claimed a device of the character under consideration which has proven quite practical, and highly satisfactory in use, and it is the main object of the present invention to improve upon the type of apparatus illustrated in the said patent, whereby to obtain even greater efficiency and more satisfactory results.

One of the objects of the present invention is to provide an attachment of the character under consideration for properly adjusting the lamps, the said attachment being of a character to more uniformly effect movement of the lights simultaneously, and of a character adapted to overcome the usual vibration of the lamps incident to adjusting connections and as heretofore largely employed. In this connection, it has been ascertained that because of the peculiar connections between the steering mechanism and the lamps any jarring movement of the steering mechanism and connections incident to traveling over rough surfaces and the like is largely imparted to the lamps with the result that the latter will not be maintained steady, which is objectionable not only because of the unsteady lighting effect, but also because the jar often results in breakage or damage to the lamp parts, and when oil is employed as the light creating medium, the lamps oftentimes go out. It is therefore proposed by the present invention to provide novel and improved operative connections between the steering mechanism and adjustable lamps, with the result that the latter will be maintained steady at all times regardless of jarring or vibratory movement of the axle and adjusting mechanism connected with the latter.

In carrying out the above feature of the invention, the adjusting connection interposed between the steering mechanism and the lamps conveniently takes the form of leverage mechanism, the connections between the various parts being of a highly flexible character, with the result that while strength and durability are maintained, at the same time, the various parts are sufficiently yieldable to accomplish the above satisfactory results.

As in my prior patent, it is proposed to attach the adjusting mechanism to the axle of the vehicle, but such attachment in the improved construction herein is of a character making possible the connection without drilling or otherwise altering the axle part, and the connection is such as to make the attachment applicable to axles of various types without changing or injuring the latter.

It is also proposed by the present invention, to operatively connect the adjusting mechanism for the lamps with the usual tie rod projecting between the steering mechanism of the respective front wheels at a point substantially centrally or midway between the ends of said tie rod, with the result that regardless of any variation in the movement or adjustment of the tie rod at its opposite ends, the actuating mechanism for the lamps will be uniform or equal in opposite directions.

Another feature of the invention includes a novel supporting means for the lamps whereby the same may readily rotate without undue friction, and novel supporting connection between the levers and said lamps whereby the actuation of the latter is more direct and uniform.

Still further and other improvements and novel details in the construction and arrangement of the various parts, of my invention, will be appreciated from the description to follow, which, for a clear understanding of the invention is to be considered in connection with the accompanying drawings which form a part hereof and wherein is disclosed, for the purpose of illustration, a convenient and satisfactory embodiment of the invention, it being noted in this connection however, that minor changes in details and arrangement of parts may be resorted to and still be within the spirit and contemplation of the invention.

In the drawings:—

Figure 1 is a front elevation of the device operatively connected with a motor vehicle.

Fig. 2 is an enlarged detail view partly in section of the lamp support, the latter being broken away.

Figs. 3 and 4 are top plan views of parts of the adjusting mechanism enlarged.

Fig. 5 is a detail view enlarged of one of the flexible connections between the lever parts.

With more particular reference to the drawings wherein like reference numerals refer to corresponding parts throughout the several views, 1 is a tie rod or connecting rod of any approved type, the same being connected with the steering mechanism as usual, whereby to impart simultaneous turning movement to the front or steering wheels of the motor vehicle. 2 is an axle, 3 a radiator frame and 4 suitable bracket supports extending from or constituting part of the framework of the machine. Lamp brackets 17 are provided, the latter having a shank or stem 18 having a lower threaded terminal 19. Suitable supports 20 are provided having an angled downward extension 21 having a threaded terminal 22. The extension 21 is adapted to fit in an aperture of the supporting bracket 4, a nut 23 being threaded to the part 22 of the extension, whereby to maintain the support 20 in fixed position upon the bracket 4, the said nut 23 coöperating with a shouldered portion 24 for this purpose.

Each of the supports 20 has an aperture for the reception of the projecting stem 18 of the lamp brackets, the wall surrounding the aperture having an intermediate annular shoulder part 25 of a diameter somewhat greater than the diameter of the stem 18, whereby to provide a space between these parts for the reception of a sleeve 26, the latter having at its upper end an annular shoulder or flange 27 overlying the upper surface of the shoulder 25. A suitable wear plate or washer 28 is adapted to underlie the undersurface of said shoulder 25 and to rest upon a retaining nut 29 threaded upon the lower end of the upright support or stem 18 of the lamp bracket. A suitable washer 30 having an annular series of anti-friction bearings 31 is interposed between the upper surface of the shoulder or flange 25, and the shoulder or flange 27, and a similar washer 32 having ball bearings 33 is interposed between the lower or undersurface of said shoulder or flange 25 and said washer 28. The stem 18 of the bracket has an annular shoulder 34 overlying the flange 27 of the sleeve 26, and interposed between said shoulder and the flange 27 is a sleeve member 35 positioned on the stem 18 of the lamp bracket and having an offset part to engage an offset part of said stem 18, whereby to form a locking connection between the lamp bracket stem 18 and the sleeve member 35 with the result that these parts will rotate together while permitting of relative sliding movement, to the end that the parts may be separated as desired.

From the construction thus far described, it will be observed that the lamps are supported in relatively fixed position through the medium of the main support 20 and at the same time, the lamp brackets 17 are free for rotatable movement in said supports, and the particular bearing for the lamp brackets makes this rotatable adjustment a noiseless one and free from any substantial friction, with the result that as the lamps are operated by the steering mechanism through the medium of the leverage connection to be described, substantially no additional strain is imparted to the steering mechanism, and at the same time substantially no additional effort or labor on the part of the operator in the steering of the car is required to simultaneously adjust the wheels and the lamps.

The leverage connection between the steering mechanism and the lamp brackets will now be described.

A suitable clamp is adapted to be applied to the axle 2 preferably to one side of the center thereof, and said clamp in the preferred form takes the form of a U-shaped lower member 36 and a top plate 37, the arms of the U-shaped member passing through apertures in the plate 37 and being threaded at their ends, whereby to receive securing nuts 38 to rigidly secure the clamp about the axle. This type of clamp is as will be appreciated, applicable to most of the ordinary axles at present in use, without the necessity of drilling or otherwise altering the construction of the axle. Projecting upwardly from the clamp is a central boss 39 adapted to provide a pivotal bearing for a horizontally disposed rock arm 40, to one end of which is pivotally connected an arm 41 adapted to be pivotally connected at 42 to the tie rod or connecting rod 1 of the steering mechanism at a point midway between the ends of the latter. The connection between the arm 41 and the connecting rod 1 being midway of the ends of the latter, an accurate adjustment of the leverage mechanism under consideration results, regardless of any variation in the movement of the tie rod at opposite ends. Pivotally connected to the opposite end of the horizontal rock arm 40 is an elongated arm 43 pivotally connected at its opposite end to the lower end of a vertically disposed rock arm 44 pivotally mounted at 45 upon the framework of the machine, conveniently the radiator frame. Pivotally connected to the upper end of the rock arm 44 is an actuating arm 46 having a pivotal connection at 47 with the rear end of the plate 35 mounted upon the lamp bracket supporting stem 18 and projecting rearwardly from the latter. It is understood of course, that the opposite lamp bracket has mounted thereon a plate 35ª somewhat similar in construction to the plate 35 and projecting rearwardly from the lamp bracket, and a connecting rod 48 projects between the plates 35 and 35ª and has pivotal connection with each of said plates, with the result that any movement imparted to the arm 35 and in turn to the lamp bracket will be transmitted to the plate 35ª and the coöperating lamp bracket. The rotatable movement of both lamp brackets will therefore correspond.

It is quite desirable that the various pivotal connections between the lever parts be such as to permit of yieldability and at the same time permit of universal play, and these various connections being generally indicated by the reference character (a) being similar in construction, a description of one will suffice for all. Take for instance, the rock arm 44, the same has at one end a threaded recessed portion adapted to receive a threaded pin 49 which latter terminates at its upper end in a suitable ball 50 pivoted in a suitable socket member 51, whereby to have universal relative movement. The socket member 51 conveniently takes the form of a tube and has a slotted guideway 52 whereby to allow for longitudinal play of the pin 49 and the parts connected therewith. A suitable spring 53 tends to normally retain the ball in one of its positions of adjustment. The tubular socket member 51 at its opposite end has a threaded aperture 54, whereby to receive a threaded end of the arm or part 46.

Likewise, the opposite end of the rock arm 44 is provided with a threaded terminal to receive the threaded pin 49 of a similar coupling attachment adapted to be connected with the elongated arm 43. A suitable lock nut 55 may be provided to prevent turning movement of the pin or stem 49 when seated in position.

It will be appreciated that the spring supported ball and socket coupling member thus provided between the various connecting arms permits of slight relative movement between these parts, and it will also be appreciated that the spring connection at one end of the arms coöperates with the spring connection at the opposite end of the arms, to form a cushioning effect regardless of the direction of movement of the arms. It will also be seen that considerable vibration usually present in connection with the steering mechanism will thus be taken care of and that such vibration will not be transmitted to the lamps, but the latter will be maintained firm and steady.

The operation may be briefly reviewed as follows:—

Assuming that the steering mechanism is operated to turn the front or steering wheels of the vehicle in one direction or the other, the tie rod : will be moved longitudinally according to the desired movement which will result in a longitudinal movement of the arm 41 and a rocking movement of the arm 40. This movement of the arm 40 will result in a longitudinal movement of the arm 43 in a direction opposite to the movement of the arm 41 and will also result in the rocking movement of the arm 44 which latter in turn will impart longitudinal movement to the actuating arm 46 in a direction opposite to the movement of the arm 43, and in the same direction as a connecting arm 1 with the result that the respective lamps through the medium of a connection 48 will be simultaneously moved in the same direction as the wheels.

The attachment is such as to result in a very easy and accurate manipulation of the lamps, and without interfering with any of the customary attachments on the motor vehicle.

What I claim is:—

1. In a motor vehicle, the combination with a steering apparatus, including a connecting rod between the wheels, a front axle and rotatable lamp supports mounted on the vehicle, of a rock arm pivotally mounted intermediate its ends upon the axle to one side of the center thereof and having at one end an operative connection with the connecting rod midway of the ends of the latter, an auxiliary rock arm connected to the body of the vehicle, an arm connecting the other end of the first mentioned rock arm with one end of the auxiliary rock arm, a connecting arm pivotally connected at opposite ends to the lamp supports, and a rod secured at one end to one of the lamp supports and pivotally connected at its opposite end to the other end of the auxiliary rock arm.

2. In a motor vehicle, the combination of rotatable lamp supports, steering mechanism including a connecting rod, a rock arm mounted upon the axle, a yieldable connection between one end of said rock arm and said connecting rod, substantially midway between the ends of the latter, operative yieldable connection between the opposite end of said rock arm and one of said lamp supports, and operative connection between the respective lamp supports whereby the latter are simultaneously adjusted through the medium of said connecting rod.

3. In an attachment for motor vehicles having steering mechanism including a connecting rod and rotatable lamp supports, the combination of a rock arm pivotally supported intermediate its ends, a rod projecting from one end of the rock arm and connected at its opposite end to said connecting rod at the center thereof, an auxiliary rock arm, operative connection between one end of the auxiliary rock arm and the lamp supports, whereby to oscillate the same and operative connection between the opposite end of said rock arm and the free end of the first mentioned rock arm.

4. An attachment for motor vehicles having steering mechanism including a connecting rod, comprising rotatable lamp supports, operative connection between the lamp supports whereby rotatable movement of one results in rotatable movement of the other, and means for rotating one of said lamp supports including a suitably supported rock arm, an arm connected to one end of the rock arm and at the opposite end to the connecting rod midway between the ends of the latter, and leverage connection between the opposite end of said rock arm and one of said lamp supports.

5. In a motor vehicle, the combination of lamp brackets, supports for the latter, the brackets being mounted for rotatable movement relative to the supports, anti-friction bearings interposed between the brackets and said supports, connection between the brackets whereby they are simultaneously rotated, and means for rotating the brackets including a vertically disposed rock arm mounted on the frame of the vehicle, an arm yieldably connected at one end to the upper end of said rock arm and yieldably connected at its opposite end to the lamp bracket, a connecting bar between the respective lamp brackets, an operative connection between the opposite end of the rock arm and the steering mechanism.

6. In an attachment for motor vehicles having steering mechanism including a connecting rod, and rotatable lamp supports, the combination of a horizontally disposed rock arm pivotally supported intermediate its ends, a rod projecting from one end of the rock arm and connected at its opposite end to said connecting rod adjacent the center thereof, a vertically disposed rock arm, operative connection between one end of the last mentioned rock arm and the lamp supports whereby to oscillate the same, an operative connection between the opposite end of said rock arm and the free end of the horizontally disposed rock arm.

7. In a motor vehicle, the combination of lamp brackets mounted for rotatable movement, a connecting rod between the brackets whereby the movement of one will impart movement to the other, a vertically disposed rock arm pivotally supported intermediate its ends, a rod having at one end an eccentric connection with one of the lamp brackets whereby to rotate the same and operatively connected at its opposite end to the upper end of the rock arm, steering mechanism including a connecting rod and leverage connection between said connecting rod and the lower end of the rock arm, said last mentioned connection including a plurality of yieldably connected arms.

8. In a motor vehicle, the combination of lamp brackets mounted for rotatable adjustment, a connecting rod between the brackets, a vertically disposed rock arm pivoted to the frame of the vehicle adjacent one of said lamp brackets, a rod movably connected at one end to the upper end of said rock arm and at its opposite end eccentrically to said lamp bracket, a horizontally disposed rock arm mounted upon the front axle of the vehicle, steering wheels, a connecting rod between the steering wheels, an arm secured to said connecting rod substantially midway between the ends thereof and connected to one end of said horizontally disposed rock arm, and an auxiliary arm connected to the opposite end of said horizontally disposed rock arm and to the lower end of the vertically disposed rock arm.

9. In a motor vehicle, the combination of lamp brackets mounted for rotatable adjustment, a connecting rod between the brackets, a vertically disposed rock arm pivoted to the frame of the vehicle adjacent one of said lamp brackets, a rod movably and yieldably connected at one end to the upper end of said rock arm and at its opposite end eccentrically to said lamp bracket, a horizontally disposed rock arm mounted upon the front axle of the vehicle, steering wheels, a connecting rod between the steering wheels, an arm yieldably secured to said connecting rod substantially midway between the ends thereof and connected to one end of said horizontally disposed rock arm, and an auxiliary arm yieldably connected to the opposite end of said horizontally disposed rock arm and to the lower end of the vertically disposed rock arm.

10. In a motor vehicle, the combination of a front axle, a clamp mounted upon the front axle to one side of the center thereof, steering wheels, a connecting rod, a horizontally disposed rock arm pivoted intermediate its ends to said clamp, a support arranged centrally of said connecting rod, an arm extending longitudinally of said connecting rod and connected at one end to said support and at its opposite end to said rock arm, a vertically disposed rock arm, a longitudinally extending connecting arm between the lower end of said last mentioned rock arm and the free end of the first mentioned rock arm, and connections between the vertically disposed rock arm and the lamp brackets for rotating the latter.

11. In a headlight adjuster for automobiles, the combination of oppositely disposed supporting members, lamp supports including a stem positioned in recesses of said supporting members for relative rotatable movement, lugs sleeved upon said stems for rotatable movement therewith, a connecting rod between said lugs, a rock arm pivoted intermediate its ends to a fixed support, an actuating connection for one end of the rock arm adapted to be applied to steering mechanism, and an arm connected at one end to the opposite end of said rock arm and at its opposite end to one of said lugs.

In testimony whereof I affix my signature in presence of two witnesses.

PEMBROKE NESBIT SQUIRES.

Witnesses:
M. S. McGrew,
Geo. M. Workman.